United States Patent Office 3,532,383
Patented Oct. 6, 1970

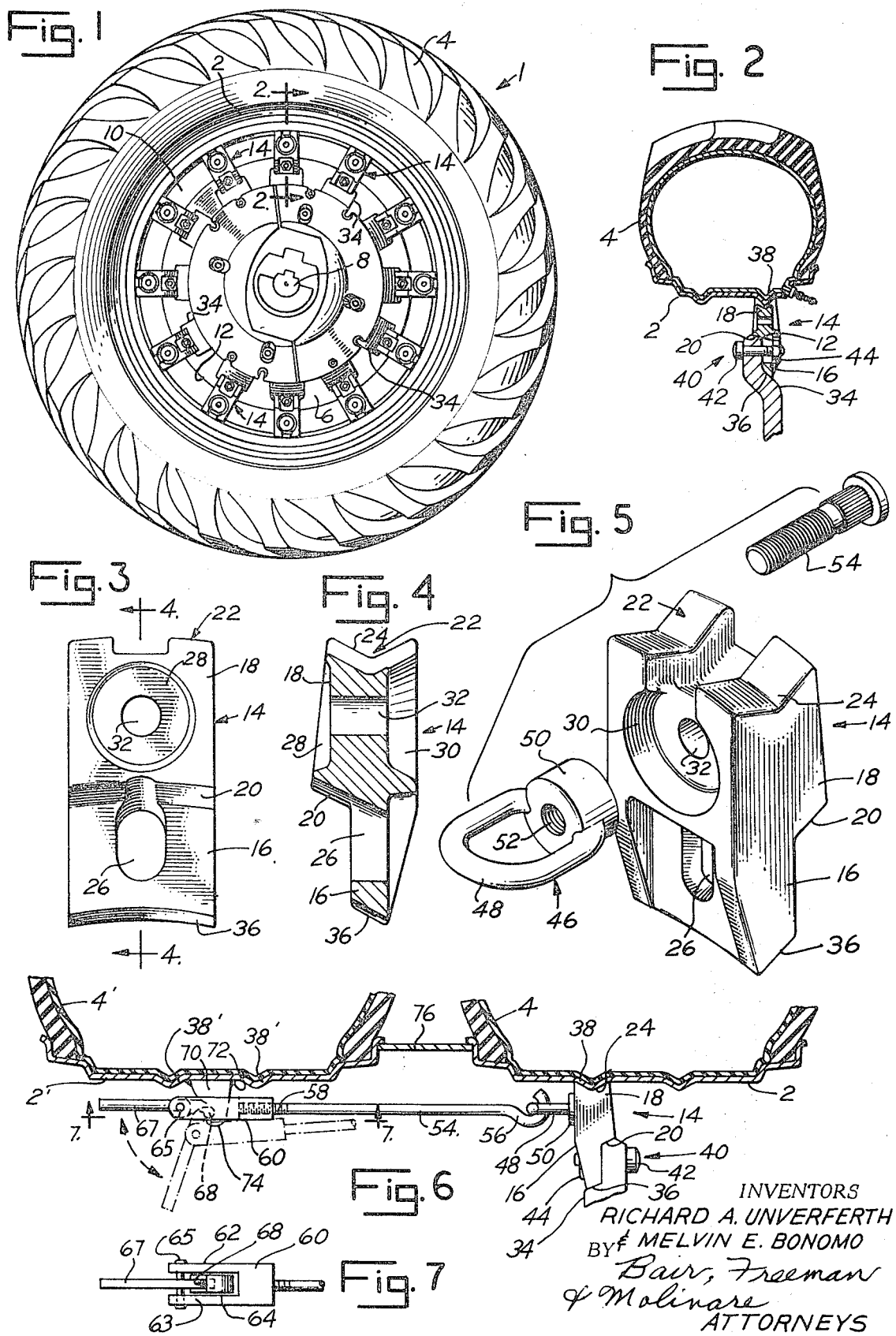

3,532,383
WHEEL ADAPTERS
Richard A. Unverferth and Melvin E. Bonomo, Kalida,
Ohio, assignors to Richard A. Unverferth
Filed Mar. 12, 1968, Ser. No. 712,543
Int. Cl. B60b *11/02, 23/02*
U.S. Cl. 301—9                                        7 Claims

ABSTRACT OF THE DISCLOSURE

A wheel adapter for and a method of attaching a large diameter vehicle tire to a vehicle wheel designed for substantially smaller diameter tires. A plurality of wheel adapters are provided which bridge the substantially large space between the wheel and the oversize tire rim. An inclined shoulder of each adapter engages the wheel periphery and a notched end surface engages a rib on the tire rim. As the adapters are tightened against the wheel by a fastening bolt, the adapters are urged in a radially outward direction by the inclined shoulder and their notched end surfaces are thereby urged into firm contact with the rim. At least some of the wheel adapters are further provided with an anchor member to which an adjustable bolt may be attached to anchor a second tire to the first assembly to provide for multiple tire vehicle operation.

BACKGROUND OF THE INVENTION

This invention relates to a wheel adapter for and a method of attaching vehicle tires having a large diameter to vehicle wheels designed for tires of a substantially smaller diameter.

It is frequently necessary to change the tire size of tractors and other related vehicles to better adapt these vehicles for particular work functions. For example, one might desire to utilize a farm tractor for soil plowing and snow removal as well as cultivating and harvesting. A tire having a wide base and/or a small diameter produces better traction for work where the tractor must operate in soft soil or under heavy loads, such as during plowing or snow removal. Where the degree of traction is not as important, but speed and economy are, a narrow base and/or larger diameter tire is more desirable, such as during harvesting.

Previously, in order to replace small diameter tires with tires having a larger diameter, it was necessary to not only remove and replace the presently installed tire but also remove and replace the tractor wheel installed on the tractor with a wheel which was designed to fit the new tire desired to be installed. This replacement was thus laborious and time consuming and required a stock of various size wheels to be maintained.

A principal object of the present invention is to provide a new and improved wheel adapter as well as a new and improved method which enables the installation of a large diameter vehicle tire on an already installed wheel designed for tires of a much smaller diameter. This replacement may be performed without necessitating the removal of the installed wheel, thereby saving time and laborious work and obviating the need of maintaining a stock of various size wheels on hand.

Another object of the invention is to provide an improved apparatus and method to allow for the addition of another second tire alongside the first to provide for added traction where desired, without necessitating the removal of the first tire or replacement of the wheel or other assembly.

SUMMARY OF THE INVENTION

An adapter and a method are provided whereby a large diameter tire may be easily and rapidly placed on a preexisting wheel designed for a much smaller tire. The adapter bridges the space between the tire rim and wheel and is urged into firm contact with both the rim and wheel by fastening means. An anchor member is provided on the adapter for adding a second tire to the installation if desired.

These and other objects, features and advantages of the present invention will be more clearly understood following a consideration of the following detailed description.

BRIEF DESCRIPTION OF THE DRAWING

Reference will frequently be made to the attached drawing in which:

FIG. 1 is a view of a tire and wheel assembly integrally joined to each other by the wheel adapters and method of the present invention;

FIG. 2 shows a detailed cross-sectioned view of the tire, wheel and a wheel adapter taken along line 2—2 of FIG. 1;

FIG. 3 is a view of a wheel adapter embodying the principles of the present invention;

FIG. 4 is a cross-sectioned view of the wheel adapter taken along line 4—4 of FIG. 3;

FIG. 5 is an exploded view of a wheel adapter including an anchor member for attaching a second tire;

FIG. 6 is a view of an assembly for attaching a second tire in accordance with the principles of the invention; and FIG. 7 is a view taken along line 7—7 of FIG. 6.

DESCRIPTION OF THE PREFERRED
EMBODIMENT

The preferred embodiment of a wheel adapter constructed in accordance with the principles of my invention is shown in FIGS. 1-4 of the drawings. In FIG. 1, the overall assembly 1 includes a rim 2 having a tire 4 mounted thereon. A standard wheel 6 is mounted on an axle 8 of a vehicle. As is the general practice, the wheel 6 is generally of a given diameter and designed for use with a tire and tire rim also of a certain given diameter. However as shown in FIG. 1, the rim 2 is of a diameter substantially greater than the diameter of tire and rim for which the wheel 6 is normally designed. Thus, a substantially large annular space 10 obtains between rim 2 and the periphery 12 of wheel.

In mounting the larger rim 2 on the wheel, a plurality of lug members or wheel adapters 14 are inserted in annular space 10 at substantially equally spaced distances around the periphery 14 of wheel 6.

As shown in FIGS. 3 and 4, each of the lug members or wheel adapters 14 is block-like in shape and includes a first portion 16 and a second generally thicker portion 18. Where the first and second portions meet, the wheel adapter carries an inclined shoulder surface 20. At the extreme end of the second portion 18 is disposed an end surface 22 having a V-shaped groove 24 thereon. The first portion 16 includes an elongated slot 26, the purpose of which will later be described. Each of the two opposite faces of the second portion 18 includes depressions 28 and 30 and leading between the depressions is an opening 32. The first portion 16 may also include an inclined bottom shoulder 36 which is adapted to rest on an end of raised ridges 34 on the wheel 6. Some or all of the V-shaped groove 24, inclined shoulder surface 20 or inclined bottom surface 36 may be arcuate to generally conform with the various surfaces they will contact in the assembled structure which will now be described.

The lug member or wheel adapter, in its assembled position, is shown in FIGS. 1 and 2. The periphery 12 of wheel 6 is in contact with the inclined shoulder surface 20 of the wheel adapter and the inclined bottom shoulder 36 rests on the end of the raised ridge 34 of the wheel. The rim 2 includes a plurality of raised rim ribs 38, which contact the end surface 22 of the wheel adapter and ride within its V-shaped groove 24. The second portion 18 of the wheel adapter 14 is installed in the annular space 10 such that the second portion 18 bridges the space 10. The wheel adapter is generally inserted from the right, as viewed in FIG. 2 such that the inclined shoulder surface 20 rests on the wheel periphery 12 and the V-shaped grooved end surface 24 engages the raised rim rib 38. Fastening means 40, which may consist of a bolt 42 and nut 44, is then inserted through the wheel adapter's elongated slot 26 and the wheel adapter is fastened to the wheel 6. As the fastening means 40 is tightened, the inclined shoulder surface 20 and bottom shoulder 36 ride to the left on the periphery 12 and the ridge 34 of the wheel. Due to the incline of the shoulder surfaces 20 and 36 the wheel adapter is urged in an upward direction, as viewed in FIG. 2, toward rim rib 38. Since the slot 26 is elongated, the wheel adapter may ride up and down with respect to the fastening means 40 as the fastening means is tightened or loosened, respectively. Thus, upon tightening, the inclined shoulder surface 20 firmly contacts the wheel periphery 12, the bottom shoulder 36 firmly contacts an end of the raised ridge 34, and the end shoulder surface 22 and its associated V-shaped groove 24 firmly contacts the raised rim rib 38. Thus, the large tire rim 2 with its associated tire 4 and the small diameter wheel 6 are integrally locked together into the assembly, as shown in FIG. 1.

If it is desired to add a second tire 4' next to the first tire 4 to provide a multiple tire arrangement, the lug member or wheel adapter 14 may include an anchoring member 46. As shown in FIG. 5, the anchoring member 46 includes a ring member 48 firmly attached to a base member 50. The base member 50 has a threaded hole 52 whereby a bolt 54 may be inserted through the second portion 18 of the wheel adapter. If it is desired to install the anchor member on the wheel adapter, base 50 is inserted into depression 30 in the face of the second portion 18 of the wheel adapter. Bolt 54 is inserted through the wheel adapter through opening 32 from the other opposite face and its associated depression 28. Since the anchor member is threadedly engaged by bolt 54, the position of the ring 48 may be rotatably adjusted as desired between horizontal and vertical to facilitate its connection with an adjustable bolt 54, as will later be described.

As shown in FIGS. 6 and 7, an adjustable bolt 54, having a hooked end 56, is hooked into the ring member 48 of the anchor member. Attached to the other end of adjustable bolt 54, as by threads 58, is a yoke 60. The yoke includes a pair of finger-like extensions 62 and 63 having a slot 64 therebetween. A lever 67 is pivotally carried by a pivot pin 65 which runs through the ends of fingers 62 and 63. The lever 67 has a curved protrusion 68 extending past its pivot point into slot 64.

The second tire 4', desired to be attached to the first assembly 1, includes a rim 2' having a bracket 70 rigidly affixed thereto, as by weld 72. The bracket 70 is preferably attached to the valley portion between the two ribs 38' to leave the ribs free for use as previously described. The bracket also includes a curved protrusion 74 which is adapted to mate with the curved protrusion 68 of the lever.

When mounting the second tire 4' adjacent the first tire 4, anchor members 46 are installed on at least some of the wheel adapters 14. Bolt 54 is inserted through depression 30 and opening 32 on each of the selected adapters such that the bolt projects into the depression 30 on the face of each of the selected adapters. Base 50 and its associated anchor member 46 is then screwed onto the bolt 54 by twisting the ring member 48 until the base 50 firmly contacts the depression 30 and the ring member is in proper alignment to receive the adjustable hook end 56. A rim spacer 76 is then placed adjacent rim 2 of the first assembly and the second tire 4' and its associated rim 2' are placed adjacent the spacer 76. Hooked end 56 of adjustable bolt 54 is hooked onto ring member 48. The curved protrusion 74 of the bracket member 70 is placed between the fingers 62 and 63 of yoke 60 through the slot 64. The opposite end of the bolt is then swung from its dotted line position, as shown in FIG. 6, to its solid line position adjacent the rim 2' of the second tire about its pivot point 65; the curved protrusion 68 thereby mating with and grasping the curved protrusion 74 of the bracket drawing tension on the bolt 54 and pressing the two rims and their associated tires together into a parallel multiple asssembly.

From the above description it may readily be seen that not only may tires of large diameters be affixed to standard vehicle wheels, but also tires of varying width may be so affixed, since the wheel adapter of the present invention engages the tire rim 2 at only one point on its surface. Moreover, a second tire of increased diameter may be attached to a first tire assembly also having a tire of increased diameter, thereby providing for multiple wheel vehicle operation. By providing the wheel adapter with the anchor member 46, rather than mounting the anchor member on the wheel itself, the tension force exerted by the bolt 54 is exerted in a horizontal direction rather than at an angle, thereby more effectively pulling the two tires firmly together in the multiple increased diameter wheel assembly. Moreover, since the invention provides for attaching varying width and/or diameter tires to already installed vehicle wheels, the necessity of changing the vehicle wheels when the use of a larger tire is desired is thereby obviated.

It is to be understood that the embodiment of the invention which has been described is merely illustrative of an application of the principles of the present invention. Numerous modifications may be made by those skilled in the art without departing from the true spirit and scope of the invention.

What is claimed is:

1. An assembly for enabling the use of large diameter tires on vehicle wheels designed for tires of a substantially lesser diameter, comprising:

a generally circular vehicle wheel having a predetermined diameter and a generally circular tire rim having a substantially larger diameter than said predetermined diameter and having a vehicle tire mounted thereon, said tire rim and said wheel being in generally concentric arrangement and defining a substantially large annular space therebetween, at least one raised rib on a surface of said rim facing said wheel, a plurality of wheel adapters each having a first portion and a second portion, said second portion bridging the width of said annular space, and being rigidly attached to said first portion, an inclined shoulder surface on said second portion engaging the periphery of said wheel, an inclined end surface on said second portion engaging said raised rib of said rim, and fastening means on said first portion for engaging said wheel and urging said inclined shoulder surface into firm contact with the periphery of said wheel and said inclined end surface into firm contact with said raised rib, the minimum length of said second portion of each of said adapters between said inclined shoulder and end surface being substantially large relative to the maximum distance between said inclined shoulder surface and said fastening means whereby the rim may be firmly and integrally mounted on a vehicle wheel designed for tires and rims of a substantially lesser diameter said second portion having means along its length for fastening anchor means adapted to detachably connect a second rim concentrically with said tire rim.

2. The assembly of claim 1 wherein said inclined end surface is defined by a generally V-shaped groove and said raised rib is also generally V-shaped and is disposed in said groove.

3. The assembly of claim 2 wherein said fastening means includes an elongated slot defined by said first portion and a fastening bolt extending through said elongated slot and connected to said wheel, said first portion being movable with respect to said bolt along the axis of the elongation of said slot during fastening of said bolt.

4. The assembly of claim 3 wherein said inclined shoulder surface is arcuate.

5. The assembly of claim 3 wherein said inclined end surface is arcuate.

6. An assembly for enabling the use of large diameter tires on vehicle wheels designed for tires of a substantially lesser diameter, comprising:
- a generally circular vehicle wheel having a predetermined diameter and a generally circular tire rim having a substantially larger diameter than said predetermined diameter and having a vehicle tire mounted thereon, said tire rim and said wheel being in generally concentric arrangement and defining a substantially large annular space therebetween,
- at least one raised rib on a surface of said rim facing said wheel,
- a plurality of wheel adapters each having a first portion and a second portion, said second portion bridging the width of said annular space, and being rigidly attached to said first portion,
- an inclined shoulder surface on said second portion engaging the periphery of said wheel,
- an inclined end surface on said second portion engaging said raised rib of said rim.
- fastening means on said first portion for engaging said wheel and urging said inclined shoulder surface into firm contact with the periphery of said wheel and said inclined end surface into firm contact with said raised rib, whereby the rim may be firmly and integrally mounted on a vehicle wheel designed for tires and rims of a substantially lesser diameter,
- anchor means extending in a direction opposite said wheel from said second portion of at least some of said wheel adapters between said fastening means and said inclined end surface,
- a second generally circular tire rim having a vehicle tire mounted thereon and spaced from said first mentioned tire rim by a spacer member,
- a plurality of bracket members arranged on said second rim and extending radially inwardly from the surface thereon, and
- adjustable bolt means attached at one end to said anchor means and including tension means at the other end for attaching said other end to said bracket means and drawing tension on said bolt means whereby said second tire rim is fixedly adjacently attached to said first mentioned tire rim to provide multiple wheel vehicle operation.

7. The assembly of claim 6 wherein said anchor means is movable with respect to said second portion to facilitate attachment of said one end of said bolt means.

References Cited
UNITED STATES PATENTS

| | | | |
|---|---|---|---|
| 2,239,463 | 4/1941 | Mills | 301—20 X |
| 2,275,897 | 3/1942 | Gifford | 301—11 X |
| 2,963,317 | 12/1960 | Stough | 301—9 |
| 3,223,455 | 12/1965 | Hammer | 301—39 |
| 3,348,884 | 10/1967 | Adams | 301—18 X |

RICHARD J. JOHNSON, Primary Examiner

U.S. Cl. X.R.

301—11, 39